(12) United States Patent
Kakimoto et al.

(10) Patent No.: US 11,840,295 B2
(45) Date of Patent: Dec. 12, 2023

(54) STEERING SYSTEM

(71) Applicants: JTEKT CORPORATION, Osaka (JP); TOYOTA JIDOSHA KABUSHIKI KAISHA, Toyota (JP)

(72) Inventors: Yusuke Kakimoto, Okazaki (JP); Yoshiyuki Uchino, Okazaki (JP); Kenji Shibata, Nagoya (JP); Takafumi Sato, Kariya (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 17/346,476

(22) Filed: Jun. 14, 2021

(65) Prior Publication Data

US 2021/0394825 A1   Dec. 23, 2021

(30) Foreign Application Priority Data

Jun. 18, 2020  (JP) .................................. 2020-105196

(51) Int. Cl.
*B62D 5/04* (2006.01)
*B62D 7/22* (2006.01)
(Continued)

(52) U.S. Cl.
CPC ............. *B62D 6/008* (2013.01); *B62D 5/006* (2013.01); *B62D 5/0466* (2013.01)

(58) Field of Classification Search
None
See application file for complete search history.

(56) References Cited

U.S. PATENT DOCUMENTS

2003/0184072 A1    10/2003   Andonian et al.
2004/0138796 A1*    7/2004   Yao .................. B62D 5/006
                                                              180/443
(Continued)

FOREIGN PATENT DOCUMENTS

DE          103 12 516 A1    10/2003
DE    10 2004 025 029 A1     1/2005
(Continued)

OTHER PUBLICATIONS

Nov. 12, 2021 Extended European Search Report issued in European Patent Application No. 21179418.5.
(Continued)

*Primary Examiner* — Adam D Tissot
*Assistant Examiner* — Laura E Linhardt
(74) *Attorney, Agent, or Firm* — Oliff PLC

(57) ABSTRACT

A steering system includes a steering shaft; a motor configured to generate a torque applied to the steering shaft; and a control unit configured to control the motor. The control unit has a function of performing steering angle feedback control for causing a steering angle that is a rotation angle of a steering wheel to reach a target steering angle that is set based on a point of view of adjusting a rotational position of the steering wheel, as an adjustment process of adjusting the rotational position of the steering wheel. The control unit is configured to set a limit value for limiting a change range of the target steering angle with respect to the steering angle at each moment in a period in which automatic rotation of the steering wheel is hindered in a case where the automatic rotation is hindered while the adjustment process is being performed.

6 Claims, 5 Drawing Sheets

(51) Int. Cl.
    *B62D 15/02*     (2006.01)
    *B62D 6/00*     (2006.01)
    *B62D 5/00*     (2006.01)

(56) References Cited

U.S. PATENT DOCUMENTS

| | | |
|---|---|---|
| 2004/0236487 A1 | 11/2004 | Yao et al. |
| 2011/0199236 A1 | 8/2011 | Hauber |
| 2018/0141584 A1* | 5/2018 | El Aile .............. B62D 15/0245 |

FOREIGN PATENT DOCUMENTS

| | | | |
|---|---|---|---|
| EP | 1308367 A2 * | 5/2003 | ............. B60R 25/02 |
| EP | 1 990 255 A2 | 11/2008 | |
| JP | 2006-321434 A | 11/2006 | |
| WO | 2019/052651 A1 | 3/2019 | |

OTHER PUBLICATIONS

Aug. 29, 2023 Office Action issued in Japanese Patent Application No. 2020-105196.

* cited by examiner

STEERING SYSTEM

CROSS-REFERENCE TO RELATED APPLICATION

This application claims priority to Japanese Patent Application No. 2020-105196 filed on Jun. 18, 2020, incorporated herein by reference in its entirety.

BACKGROUND

1. Technical Field

The disclosure relates to a steering system of a vehicle.

2. Description of Related Art

There has been a so-called steer-by-wire steering system in which transmission of power between a steering wheel and turning wheels is cut off. Such a steering system includes a reaction mechanism including a reaction motor that is a source of a steering reaction force that is applied to a steering shaft and a turning mechanism including a turning motor that is a source of a turning force for turning the turning wheels. When a vehicle is traveling, a control device for the steering system generates a steering reaction force through power supply control for the reaction motor and turns the turning wheels through power supply control for the turning motor.

In such a steer-by-wire steering system, the steering wheel is not restricted by the turning mechanism. Accordingly, when a certain external force is applied to the steering wheel in a state in which the vehicle is powered off, there is a likelihood that the steering wheel may rotate. At this time, since the turning wheels do not operate, a positional relationship between the steering wheel and the turning wheels may be different from an original positional relationship corresponding to a predetermined steering angle ratio. Here, the steering angle ratio means a ratio between a turning angle of the turning wheels and a steering angle of the steering wheel.

Therefore, for example, in a steering system disclosed in Japanese Unexamined Patent Application Publication No. 2006-321434 (JP 2006-321434 A), a process of correcting a rotational position of a steering wheel is performed when a vehicle is powered on. A control device for the steering system stores the rotational position of the steering wheel when the vehicle has been powered off. The control device calculates a displacement in the rotational position of the steering wheel by comparing the rotational position of the steering wheel when the vehicle was powered off and the rotational position of the steering wheel when the vehicle has been powered on, and drives a reaction motor such that the displacement becomes 0 (zero).

SUMMARY

With the steering system disclosed in JP 2006-321434 A, a displacement in the positional relationship between the steering wheel and the turning wheels is reliably improved. However, in the steering system disclosed in JP 2006-321434 A, there is the following concern. That is, it is conceivable that a driver may be gripping the steering wheel or the steering wheel that is automatically rotating may come into contact with the driver's body or a certain object while an adjustment process of adjusting the rotational position of the steering wheel is being performed. In this case, since automatic rotation of the steering wheel is hindered, there is a likelihood that a difference between a target steering angle that is a target value of a rotation angle of the steering wheel and an actual steering angle may be increased. Accordingly, when the reason for hindering the automatic rotation of the steering wheel is resolved, the steering wheel may rotate suddenly to the target steering angle and a driver may have a feeling of discomfort due to the sudden rotation of the steering wheel.

The disclosure provides a steering system that can decrease a driver's feeling of discomfort in a case where automatic rotation of a steering wheel is hindered and then the hindered automatic rotation is released while an adjustment process of automatically adjusting a rotational position of the steering wheel is being performed.

According to an aspect of the disclosure, there is provided a steering system including a steering shaft that rotates along with an operation of a steering wheel; a motor configured to generate a torque that is applied to the steering shaft; and a control unit configured to control the motor. The control unit has a function of performing steering angle feedback control for causing a steering angle that is a rotation angle of the steering wheel to reach a target steering angle that is set based on a point of view of adjusting a rotational position of the steering wheel as an adjustment process of adjusting the rotational position of the steering wheel. The control unit is configured to set a limit value for limiting a change range of the target steering angle with respect to the steering angle at each moment in a period in which automatic rotation of the steering wheel is hindered in a case where the automatic rotation is hindered while the adjustment process is being performed.

In the case where the automatic rotation of the steering wheel is hindered while the adjustment process of adjusting the rotational position of the steering wheel is being performed, the change range of the target steering angle is limited by the limit value that is set with respect to the steering angle at each moment in the period in which the automatic rotation is hindered. Accordingly, it is possible to curb an increase in a difference between the target steering angle and the steering angle. As a result, when the reason for hindering the automatic rotation of the steering wheel is resolved, it is possible to curb sudden change of the rotational position of the steering wheel. Since an unexpected behavior of the steering wheel is curbed, it is possible to decrease a driver's feeling of discomfort.

In the steering system according to the aspect, the control unit may have a limiting function of limiting a change amount of the target steering angle per unit time. In this case, the control unit may be configured to disable the limiting function in the period in which the automatic rotation of the steering wheel is hindered in the case where the automatic rotation is hindered while the adjustment process is being performed.

With this configuration, it is possible to limit a value of the target steering angle to a limit value that is set with respect to the steering angle at each moment regardless of a change amount of the target steering angle in predetermined operation cycle(s).

In the steering system according to the aspect, the adjustment process may include a process of causing the rotational position of the steering wheel to correspond to a turning position of turning wheels of a vehicle when a power supply of the vehicle is switched from an off state to an on state.

With this configuration, in the case where the automatic rotation of the steering wheel is hindered while the process of causing the rotational position of the steering wheel to correspond to the turning position of the turning wheels of the vehicle is being performed, it is possible to decrease a driver's feeling of discomfort when the hindered state is eliminated.

The steering system according to the aspect may further include a stopper mechanism configured to restrict rotation of the steering wheel. In this case, the adjustment process may include a process of causing the steering wheel to perform a rotating operation to a first operation end and then causing the steering wheel to perform a reverse rotating operation to a second operation end by controlling the motor, and calculating a neutral position of the steering wheel based on rotation angles of the motor at a start time point and an end time point of the reverse rotating operation of the steering wheel.

With this configuration, when the automatic rotation of the steering wheel is hindered while the process of calculating the neutral position of the steering wheel is being performed, it is possible to decrease a driver's feeling of discomfort when the hindered state is released.

In the steering system according to the aspect, transmission of power between the steering shaft and turning wheels of a vehicle may be cut off. The motor may be configured to generate a steering reaction force that is applied to the steering shaft and that is the torque in a direction opposite to a steering direction.

With this configuration, the steering system is suitable for a so-called steer-by-wire steering system.

With the steering system according to the aspect of the disclosure, it is possible to decrease a driver's feeling of discomfort in the case where automatic rotation of the steering wheel is hindered and then the hindered automatic rotation is released while the adjustment process of automatically adjusting the rotational position of the steering wheel is being performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
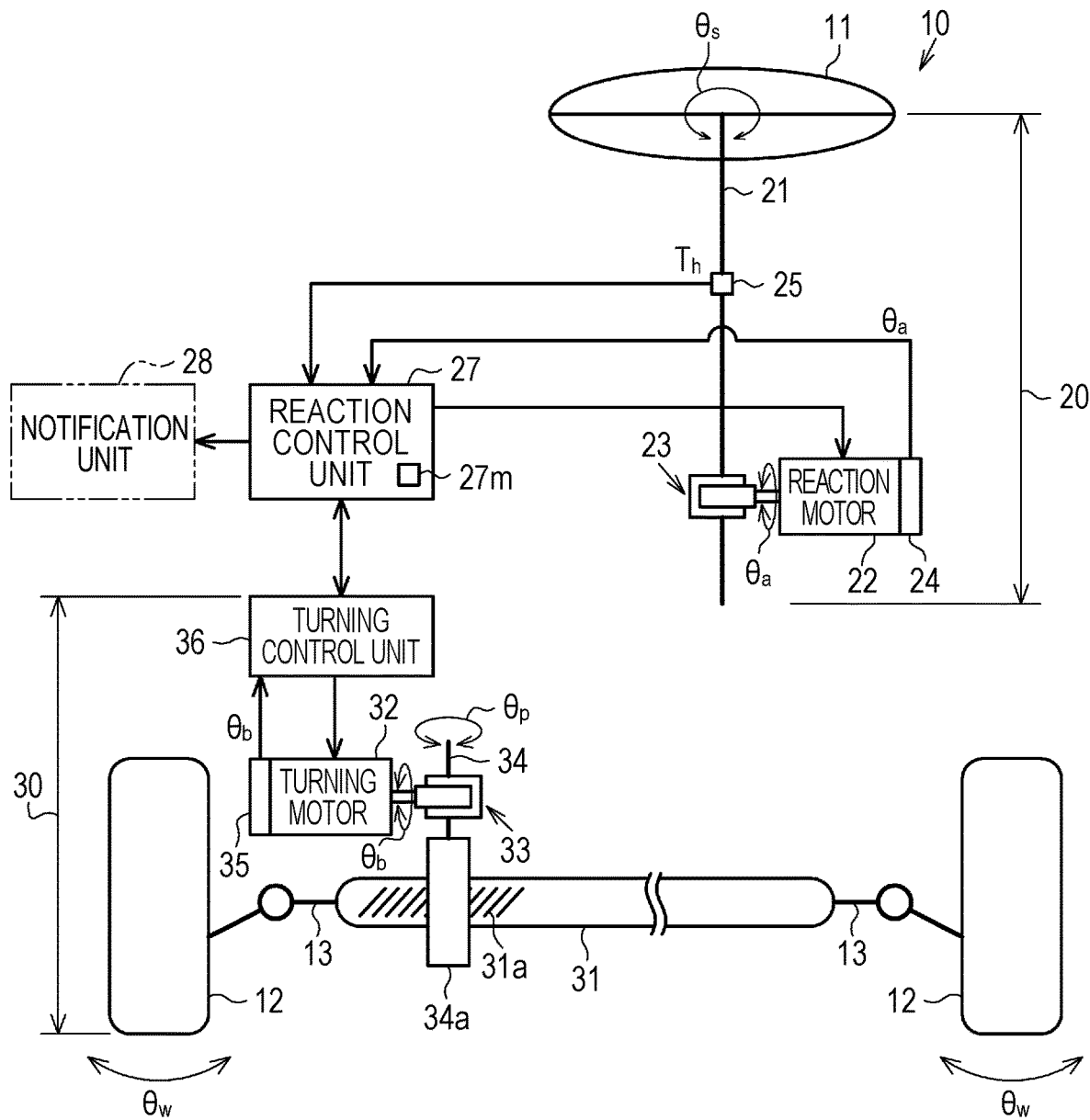
FIG. 1 is a diagram illustrating a configuration of a steering system according to a first embodiment.

Hereinafter, a steering system according to a first embodiment of the disclosure will be described. As illustrated in FIG. 1, a steering system 10 of a vehicle includes a reaction unit 20 that applies a steering reaction force to a steering wheel 11 of the vehicle and a turning unit 30 that turns turning wheels 12 of the vehicle. The steering reaction force represents a torque that is applied in a direction opposite to an operating direction of the steering wheel 11 that is operated by a driver. By applying the steering reaction force to the steering wheel 11, an appropriate feeling of reaction can be given to the driver.

The reaction unit 20 includes a steering shaft 21 to which the steering wheel 11 is connected, a reaction motor 22, a speed reduction mechanism 23, a rotation angle sensor 24, a torque sensor 25, and a reaction control unit 27.

The reaction motor 22 is a source from which a steering reaction force is generated. For example, a three-phase brushless motor is employed as the reaction motor 22. The reaction motor 22 is connected to the steering shaft 21 via the speed reduction mechanism 23. A torque that is generated by the reaction motor 22 is applied as a steering reaction force to the steering shaft 21.

The rotation angle sensor 24 is provided in the reaction motor 22. The rotation angle sensor 24 detects a rotation angle $\theta_a$ of the reaction motor 22. The torque sensor 25 is provided in a part between the speed reduction mechanism 23 and the steering wheel 11 in the steering shaft 21. The torque sensor 25 detects a steering torque $T_h$ that is applied to the steering shaft 21 through an operation of rotating the steering wheel 11.

The reaction control unit 27 calculates a steering angle $\theta_s$ that is a rotation angle of the steering shaft 21 based on the rotation angle $\theta_a$ of the reaction motor 22 detected by the rotation angle sensor 24. The reaction control unit 27 counts the number of rotations with respect to the rotation angle $\theta_a$ of the reaction motor 22 corresponding to a neutral steering position of the steering wheel 11 (hereinafter, the rotation angle $\theta_a$ corresponding to the neutral steering position will be referred to as a "motor midpoint"). The reaction control unit 27 calculates integrated total angle that is an angle obtained by totaling the rotation angle $\theta_a$ using the motor midpoint as an origin, and calculates the steering angle $\theta_s$ of the steering wheel 11 by multiplying the calculated total angle by a conversion factor based on a speed reduction ratio of the speed reduction mechanism 23. The motor midpoint is stored as steering angle midpoint information in the reaction control unit 27.

The reaction control unit 27 performs reaction control for generating a steering reaction force corresponding to the steering torque $T_h$ through drive control for the reaction motor 22. The reaction control unit 27 calculates a target steering reaction force based on the steering torque $T_h$ detected by the torque sensor 25 and calculates a target steering angle of the steering wheel 11 based on the calculated target steering reaction force and the steering torque $T_h$. The reaction control unit 27 calculates a difference between the steering angle $\theta_s$ that is calculated based on the rotation angle $\theta_a$ of the reaction motor 22 and the target steering angle, and controls supply of electric power to the reaction motor 22 such that the difference is cancelled out. The reaction control unit 27 performs vector control for the reaction motor 22 using the rotation angle $\theta_a$ of the reaction motor 22 detected by the rotation angle sensor 24.

The turning unit 30 includes a turning shaft 31, a turning motor 32, a speed reduction mechanism 33, a pinion shaft 34, a rotation angle sensor 35, and a turning control unit 36. The turning shaft 31 extends in a vehicle width direction (the right-left direction in FIG. 1). Right and left turning wheels 12 are respectively connected to both ends of the turning shaft 31 via tie rods 13.

The turning motor 32 is a source from which a turning force is generated. For example, a three-phase brushless motor is employed as the turning motor 32. The turning motor 32 is connected to the pinion shaft 34 via the speed reduction mechanism 33. Pinion teeth 34a of the pinion shaft 34 engage with rack teeth 31a of the turning shaft 31. A torque that is generated by the turning motor 32 is applied as a turning force to the turning shaft 31 via the pinion shaft 34. The turning shaft 31 moves in the vehicle width direction (the right-left direction in FIG. 1) with rotation of the turning motor 32. A turning angle $\theta_w$ of the turning wheels 12 changes with the movement of the turning shaft 31.

The rotation angle sensor 35 is provided in the turning motor 32. The rotation angle sensor 35 detects a rotation angle $\theta_b$ of the turning motor 32. The turning control unit 36 performs turning control for turning the turning wheels 12 based on a steering state through drive control for the turning motor 32. The turning control unit 36 calculates a rotation angle $\theta_p$ of the pinion shaft 34 based on the rotation angle $\theta_b$ of the turning motor 32 detected by the rotation angle sensor 35. The turning control unit 36 calculates a target rotation angle of the pinion shaft 34 based on the target steering angle calculated by the reaction control unit 27. Here, the target rotation angle of the pinion shaft 34 is calculated based on the viewpoint of realizing (i.e., achieving) a predetermined steering angle ratio. The turning control unit 36 calculates a difference between the target rotation angle of the pinion shaft 34 and an actual rotation angle $\theta_p$ and controls supply of electric power to the turning motor 32 such that the difference is cancelled out. The turning control unit 36 performs vector control for the turning motor 32 using the rotation angle $\theta_b$ of the turning motor 32 detected by the rotation angle sensor 35.

Figure 2:
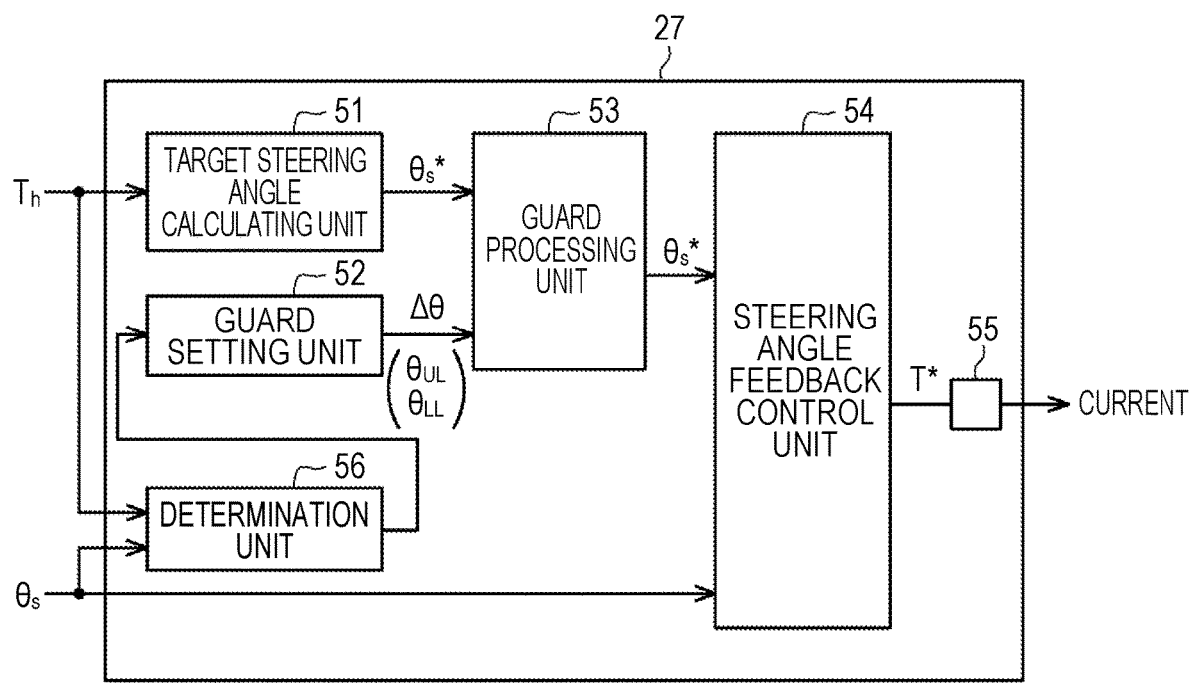
FIG. 2 is a block diagram illustrating a reaction control unit according to the first embodiment.

A part of a functional configuration of the reaction control unit 27 will be described below in detail. As illustrated in FIG. 2, the reaction control unit 27 includes a target steering angle calculating unit 51, a guard setting unit 52, a guard processing unit 53, a steering angle feedback control unit 54, and a power supply control unit 55.

The target steering angle calculating unit 51 calculates a target steering torque based on a steering torque $T_h$ detected by the torque sensor 25 and calculates a target steering reaction force through feedback control for the steering torque $T_h$ such that the steering torque $T_h$ reaches the calculated target steering torque. The target steering angle calculating unit 51 calculates a target steering angle $\theta_s^*$ of the steering wheel 11 based on the calculated target steering reaction force and the steering torque $T_h$. The target steering angle calculating unit 51 calculates the target steering angle $\theta_s^*$, for example, based on an ideal model in which the steering angle $\theta_s$ of the steering wheel 11 corresponding to an ideal turning angle based on an input torque is modeled in advance by experiment or simulation when the sum of the target steering reaction force and the steering torque $T_h$ is used as the input torque.

The guard setting unit 52 sets a limit value $\Delta\theta$ for limiting a change amount of the target steering angle $\theta_s^*$ in predetermined operation cycle(s) (for example, in one operation cycle). The guard processing unit 53 limits the change of the target steering angle $\theta_s^*$ calculated by the target steering angle calculating unit 51 based on the limit value $\Delta\theta$ set by the guard setting unit 52.

A so-called time-based change limiting function of limiting the change amount of the target steering angle $\theta_s^*$ in predetermined operation cycle(s) to the predetermined limit value $\Delta\theta$ is realized by the guard setting unit 52 and the guard processing unit 53.

The steering angle feedback control unit 54 receives the target steering angle $\theta_s^*$ processed by the guard processing unit 53 and the steering angle $\theta_s$ calculated based on the rotation angle $\theta_a$ of the reaction motor 22. The steering angle feedback control unit 54 calculates a target steering reaction force T* through feedback control for the steering angle $\theta_s$ such that the steering angle $\theta_s$ calculated based on the rotation angle $\theta_a$ of the reaction motor 22 reaches the target steering angle $\theta_s^*$.

The power supply control unit 55 supplies electric power corresponding to the target steering reaction force T* to the reaction motor 22. Specifically, the power supply control unit 55 calculates a current command value for the reaction motor 22 based on the target steering reaction force T*. The power supply control unit 55 calculates a difference between the current command value and an actual current value detected by a sensor that is not illustrated, and controls supply of electric power to the reaction motor 22 such that the difference is cancelled out. Accordingly, the reaction motor 22 generates a torque corresponding to the target steering reaction force T*.

In the steer-by-wire steering system 10, since the steering wheel 11 is not restricted by the turning unit 30, there is a likelihood that the following event will occur. That is, when the vehicle is powered on, the steering wheel 11 and the turning wheels 12 are synchronized with each other. Accordingly, a positional relationship between the steering wheel 11 and the turning wheels 12 is maintained at a positional relationship based on a predetermined steering angle ratio. When a certain external force is applied to the steering wheel 11 in a state in which the vehicle is powered off, the steering wheel 11 may rotate. At this time, since the turning shaft 31 does not operate, the positional relationship between the steering wheel 11 and the turning wheels 12 may become different from an original positional relationship based on the predetermined steering angle ratio.

Accordingly, the steering system 10 has a function of automatically adjusting a rotational position of the steering wheel 11 as an initial operation when the vehicle is powered on again. For example, when the steering wheel 11 rotates by a predetermined angle in the counterclockwise direction (a positive direction) in a period in which the vehicle is powered off, the steering wheel 11 is rotated by the predetermined angle in the clockwise direction (a negative direction) through drive control for the reaction motor 22 when the vehicle is powered on again. Accordingly, the positional relationship between the steering wheel 11 and the turning wheels 12 returns to the original positional relationship based on the predetermined steering angle ratio.

As illustrated in FIG. 1, the reaction control unit 27 includes a storage unit 27m. When a power supply of the vehicle is switched from ON to OFF (i.e., from an on state to an off state), the reaction control unit 27 stores the steering angle $\theta_s$ calculated immediately before, as a reference steering angle, in the storage unit 27m. The reference steering angle serves as a reference for determining whether the steering wheel 11 has rotated in a period in which the vehicle was powered off.

When the power supply of the vehicle is switched from OFF to ON (i.e., from the off state to the on state), the reaction control unit 27 determines whether position adjustment of the steering wheel 11 is necessary by comparing the reference steering angle stored in the storage unit 27m with the steering angle $\theta_s$ calculated immediately after the vehicle has been powered on.

When the reference steering angle that is the steering angle $\theta_s$ immediately before the vehicle is powered off and the steering angle $\theta_s$ immediately after the vehicle is powered on again match each other, the reaction control unit 27 determines that position adjustment of the steering wheel 11 is not necessary. Since the steering angle $\theta_s$ does not change in a period until the vehicle is powered on again after the vehicle has been powered off, it is apparent that the steering wheel 11 has not rotated. The reaction control unit 27 starts normal reaction control for generating a steering reaction force based on the steering torque $T_h$.

When the reference steering angle that is the steering angle $\theta_s$ immediately before the vehicle is powered off and the steering angle $\theta_s$ immediately after the vehicle is powered on again do not match each other, the reaction control unit 27 determines that position adjustment of the steering wheel 11 is necessary, and performs position adjustment of the steering wheel 11. For example, the reaction control unit 27 calculates a difference between the reference steering angle and the steering angle $\theta_s$ immediately after the vehicle has been powered on and performs supply of electric power to the reaction motor 22 such that the difference is cancelled out. Specifically, the reaction control unit 27 calculates the target steering angle $\theta_s^*$ based on the difference between the reference steering angle and the steering angle $\theta_s$ immediately after the vehicle has been powered on, and performs feedback control for the steering angle $\theta_s$ such that the steering angle $\theta_s$ reaches the calculated target steering angle $\theta_s^*$. When the reference steering angle and the current steering angle $\theta_s$ match each other, position adjustment of the steering wheel 11 is completed.

In addition, the reaction control unit 27 may use the following value as the reference steering angle. That is, the reaction control unit 27 acquires the rotation angle $\theta_p$ of the pinion shaft 34 immediately after the power supply of the vehicle is switched from OFF to ON from the turning control unit 36, and calculates the steering angle $\theta_s$ corresponding to the acquired rotation angle $\theta_p$ of the pinion shaft 34 based on a steering angle ratio. The reaction control unit 27 uses the steering angle $\theta_s$ corresponding to the calculated rotation angle $\theta_p$ of the pinion shaft 34 as the reference steering angle. With this configuration, the rotational position of the steering wheel 11 can be corrected to a position corresponding to a turning position of the turning wheels 12.

In the steering system 10 having the function of automatically adjusting the rotational position of the steering wheel 11, there may be the following problems. That is, it is conceivable that a driver may be gripping the steering wheel 11 or the steering wheel 11 that is automatically rotating may come into contact with the driver's body or a certain object while an adjustment process of adjusting the rotational position of the steering wheel 11 is being performed. In this case, since automatic rotation of the steering wheel 11 is hindered, there is a likelihood that the difference between the target steering angle $\theta_s^*$ and the actual steering angle $\theta_s$ of the steering wheel 11 will be increased. This is because the target steering angle $\theta_s^*$ increases gradually to a final target steering angle $\theta_s^*$ according to a change limiting function but the actual steering angle $\theta_s$ does not change, for example, when the steering wheel 11 is gripped. Accordingly, when the reason for hindering the automatic rotation of the steering wheel 11 is resolved, for example, when the driver detaches a hand from the steering wheel 11, the steering wheel 11 may rotate suddenly to the target steering angle $\theta_s^*$ and the driver may feel discomforted due to the sudden rotation of the steering wheel 11.

Therefore, in this embodiment, in the case where automatic rotation of the steering wheel 11 is hindered while the process of adjusting the rotational position of the steering wheel 11 is being performed, the reaction control unit 27 employs the following configuration in order to curb sudden rotation of the steering wheel 11 when the reason for hindering the automatic rotation of the steering wheel 11 is resolved.

As illustrated in FIG. 2, the reaction control unit 27 includes a determination unit 56. The determination unit 56 determines whether automatic rotation of the steering wheel 11 is hindered while the process of adjusting the rotational position of the steering wheel 11 is being performed. For example, when at least one of the following two conditions (A1) and (A2) is satisfied, the determination unit 56 determines that the automatic rotation of the steering wheel 11 is hindered. When neither of the two conditions (A1) and (A2) is satisfied, the determination unit 56 determines that the automatic rotation of the steering wheel 11 is not hindered.

$$|\theta_s^*| - |\theta_s| \geq |\theta_{th}| \tag{A1}$$

Here, "$\theta_s^*$" is a target steering angle. The value of the target steering angle $\theta_s^*$ changes gradually to a final target steering angle $\theta_s^*$ through the change limiting function. "$\theta_s$" is a steering angle that is calculated based on the rotation angle $\theta_a$ of the reaction motor 22. "$\theta_{th}$" is an angle difference threshold value. The angle difference threshold value is a value of a difference between the target steering angle $\theta_s^*$ and the steering angle $\theta_s$ that serves as a reference for determining whether the automatic rotation of the steering wheel 11 is hindered.

$$|T_h| \geq |T_{th}| \tag{A2}$$

Here, "$T_h$" is a steering torque that is detected by the torque sensor 25. "$T_{th}$" is a torque threshold value. The torque threshold value is a value of the steering torque $T_h$ that serves as a reference for determining whether the automatic rotation of the steering wheel 11 is hindered.

When the determination result from the determination unit 56 indicates that the automatic rotation of the steering wheel is hindered, the guard setting unit 52 performs the following two processes (B1) and (B2).

(B1) The change limiting function is disabled, that is, the limit value $\Delta\theta$ for limiting the change amount of the target steering angle $\theta_s^*$ is disabled. (B2) An upper limit value $\theta_{UL}$ and a lower limit value $\theta_{LL}$ are set as limiting values for limiting a change range of the target steering angle $\theta_s^*$.

The process (B1) of disabling the change limiting function includes a case in which the change limiting process does not actually function due to execution of the process (B2), in addition to a case in which execution of the change limiting function is stopped.

The guard setting unit 52 calculates the upper limit value $\theta_{UL}$ by adding a set value $\alpha$ to the steering angle $\theta_s$ at each moment that is calculated based on the rotation angle $\theta_a$ of the reaction motor 22, as expressed by Expression (C1). The set value $\alpha$ is set based on a viewpoint of curbing an increase of the difference between the target steering angle $\theta_s^*$ and the steering angle $\theta_s$ that is, a viewpoint of curbing sudden change of the steering angle $\theta_s$ when the reason for hindering the automatic rotation of the steering wheel 11 is resolved.

$$\theta_{UL} = \theta_s + \alpha \tag{C1}$$

The guard setting unit 52 calculates the lower limit value $\theta_{LL}$ by subtracting the set value $\alpha$ from the steering angle $\theta_s$ at each moment that is calculated based on the rotation angle $\theta_a$ of the reaction motor 22, as expressed by Expression (C2).

$$\theta_{UL} = \theta_s - \alpha \tag{C2}$$

When the change limiting function is disabled, the value of the target steering angle $\theta_s^*$ can be limited to the upper limit value $\theta_{UL}$ and the lower limit value $\theta_{LL}$ that are set based on the steering angle $\theta_s$ at each moment regardless of the change amount of the target steering angle $\theta_s^*$ in predetermined operation cycle(s).

The guard processing unit 53 performs a process of limiting the target steering angle $\theta_s^*$ that is calculated by the target steering angle calculating unit 51 based on the upper limit value $\theta_{UL}$ and the lower limit value $\theta_{LL}$ set by the guard setting unit 52. That is, the guard processing unit 53 compares the value of the target steering angle $\theta_s^*$ with the upper limit value $\theta_{UL}$ and compares the value of the target steering angle $\theta_s^*$ with the lower limit value $\theta_{LL}$. When the value of the target steering angle $\theta_s^*$ is greater than the upper limit value $\theta_{UL}$, the guard processing unit 53 limits the value of the target steering angle $\theta_s^*$ to the upper limit value $\theta_{UL}$. When the value of the target steering angle $\theta_s^*$ is less than the lower limit value $\theta_{LL}$, the guard processing unit 53 limits the value of the target steering angle $\theta_s^*$ to the lower limit value $\theta_{LL}$. The target steering angle $\theta_s^*$ that has been subjected to the limiting process by the guard processing unit 53 is supplied as the final target steering angle $\theta_s^*$ to the steering angle feedback control unit 54. When the value of the target steering angle $\theta_s^*$ is in a range between the upper limit value $\theta_{UL}$ and the lower limit value $\theta_{LL}$, the target steering angle $\theta_s^*$ calculated by the target steering angle calculating unit 51 is supplied as the final target steering angle $\theta_s^*$ to the steering angle feedback control unit 54 without any change.

Time-based changes of the target steering angle and the steering angle when automatic rotation of the steering wheel 11 is hindered while the process of adjusting the rotational position of the steering wheel 11 is being performed will be described below.

Here, it is assumed that the following description is based on the premise that the reason for hindering the automatic rotation of the steering wheel 11 is a driver's steering intervention. It is assumed that the steering wheel 11 is rotated by a predetermined angle in the clockwise direction (the negative direction) with respect to the turning position of the turning wheels 12 in a state in which the power supply of the vehicle is switched from ON to OFF. That is, the positional relationship between the steering wheel 11 and the turning wheels 12 is kept different from the original positional relationship based on a predetermined steering angle ratio. Here, it is assumed that the turning wheels 12 are located at a neutral turning position (the turning angle $\theta_w=0°$) corresponding to straight movement of the vehicle. In this case, the steering wheel 11 needs to be inherently located at a neutral steering position (the steering angle $\theta_s=0°$) corresponding to straight movement of the vehicle.

When the power supply of the vehicle is switched from OFF to ON, the reaction control unit 27 starts the process of adjusting the rotational position of the steering wheel 11. In the graph illustrated in FIG. 3, a characteristic line L1 represents change characteristics of the target steering angle $\theta_s^*$ when steering intervention occurs. A characteristic line L2 represents change characteristics of the steering angle $\theta_s$. As represented by the characteristic line L1 in the graph of FIG. 3, the absolute value of the target steering angle $\theta_s^*$ decreases gradually to the final target steering angle $\theta_s^*$ ($\theta_s^*=0°$ herein) by performing the change limiting function with start of position adjustment of the steering wheel 11 (time T0). As represented by the characteristic line L2 in the graph of FIG. 3, the absolute value of the steering angle $\theta_s$ decreases gradually to the final target steering angle $\theta_s^*$ to conform to the change of the target steering angle $\theta_s^*$. That is, the steering wheel 11 starts rotating in the counterclockwise direction (the positive direction). The rotation speed of the steering wheel 11 is constant.

For example, a case in which a so-called steering hold state is maintained (time T1) is assumed as a case of the driver's steering intervention. In the steering hold state, the rotational position of the steering wheel 11 is maintained by applying, to the steering wheel 11, a torque in the clockwise direction (the negative direction) that is opposite to the rotating direction in the adjustment process. In this case, the reaction control unit 27 determines that the driver's steering intervention is performed based on an increase in the difference between the target steering angle $\theta_s^*$ and the steering angle $\theta_s$ or an increase of the value of the steering torque $T_h$ (time T2). Thereafter, the reaction control unit 27 disables the change limiting function and calculates the upper limit value $\theta_{UL}$ and the lower limit value $\theta_{LL}$ based on the steering angle $\theta_s$ at each moment.

Figure 3:
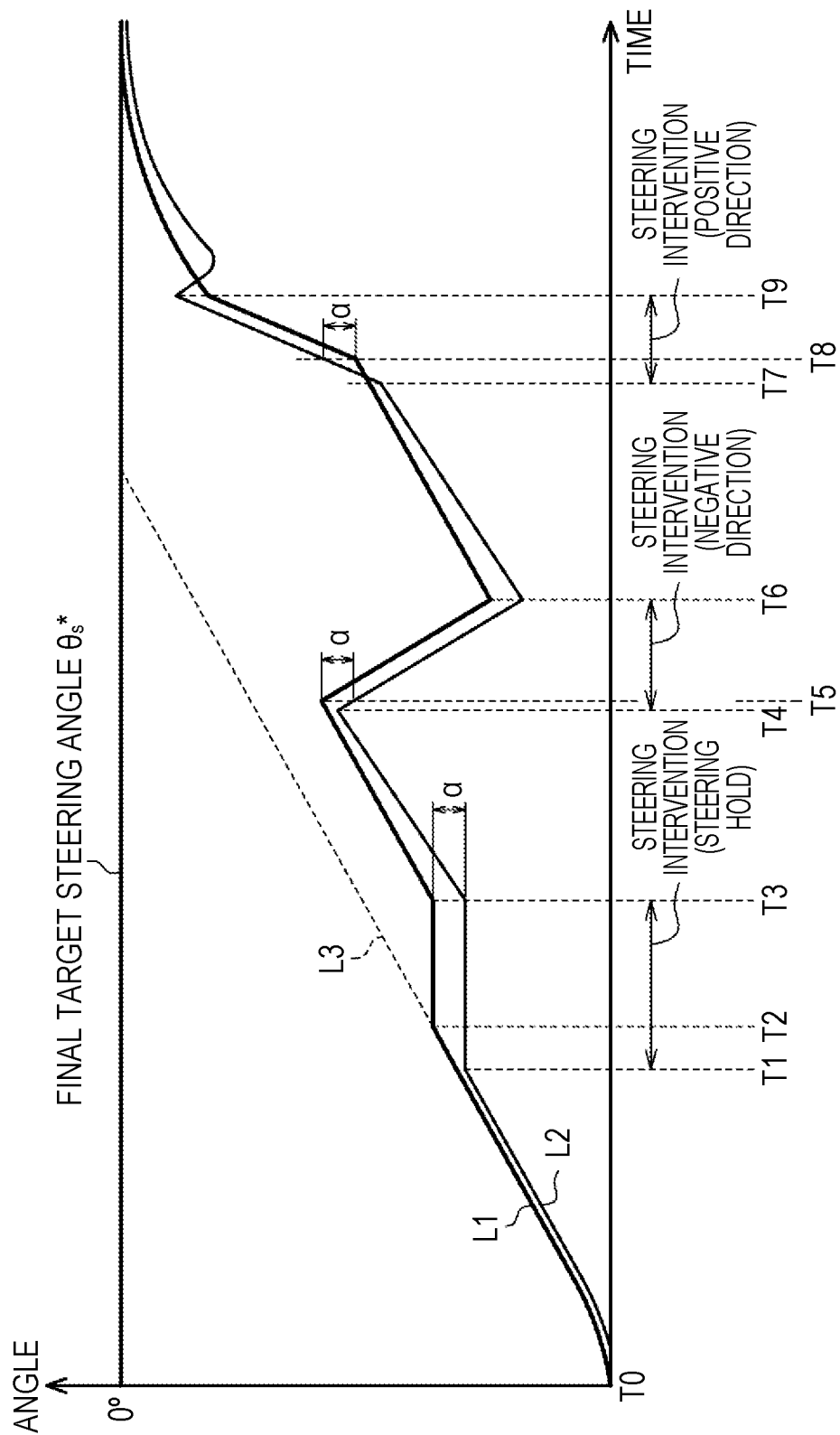
FIG. 3 is a graph illustrating time-based changes of a target steering angle and a steering angle according to the first embodiment.

In the graph illustrated in FIG. 3, a characteristic line L3 represents change characteristics of the target steering angle $\theta_s^*$ when steering intervention is not performed. When the driver's steering intervention is not performed, the absolute value of the target steering angle $\theta_s^*$ calculated by the target steering angle calculating unit 51 decreases gradually to the final target steering angle $\theta_s^*$ by performing the change limiting function as represented by the characteristic line L3 in the graph of FIG. 3. On the other hand, when the steering wheel 11 is maintained in the steering hold state by the driver, the value of the target steering angle $\theta_s^*$ calculated by the target steering angle calculating unit 51 is limited to the upper limit value $\theta_{UL}$. Since the upper limit value $\theta_{UL}$ is calculated by adding the set value $\alpha$ to the steering angle $\theta_s$ at each moment, the difference between the target steering angle $\theta_s^*$ and the steering angle $\theta_s$ is not greater than the set value $\alpha$ (i.e., the difference does not exceed the set value $\alpha$).

Thereafter, the reaction control unit 27 enables the change limiting function again when it is determined that the steering hold state of the steering wheel 11 is released (i.e., canceled) based on the difference between the target steering angle $\theta_s^*$ and the steering angle $\theta_s$ or the steering torque $T_h$ (time T3). Accordingly, the absolute value of the target steering angle $\theta_s^*$ starts decreasing gradually to the final target steering angle $\theta_s^*$ ($\theta_s^*=0°$ herein) again by performing the change limiting function.

Then, for example, a case in which the steering wheel 11 is steered in the clockwise direction (the negative direction) that is opposite to the rotating direction in the adjustment process (time T4) is assumed as a case of the driver's steering intervention. In this case, with the operation of the steering wheel 11, the steering angle $\theta_s$ increases gradually in the negative direction that is opposite to the rotating direction of the steering wheel 11 in the adjustment process. The reaction control unit 27 determines that the driver's steering intervention is performed based on the difference between the target steering angle $\theta_s^*$ and the steering angle $\theta_s$ or the steering torque $T_h$ (time T5). Thereafter, the reaction control unit 27 disables the change limiting function and calculates the upper limit value $\theta_{UL}$ and the lower limit value $\theta_{LL}$ based on the steering angle $\theta_s$ at each moment. The absolute value of the target steering angle $\theta_s^*$ calculated by the target steering angle calculating unit 51 is limited to the upper limit value $\theta_{UL}$ and thus increases gradually in the negative direction to conform to the change of the steering angle $\theta_s$. The difference between the target steering angle $\theta_s^*$ and the steering angle $\theta_s$ is not greater than the set value $\alpha$.

Thereafter, the reaction control unit 27 enables the change limiting function again when it is determined that the steering of the steering wheel in the negative direction is released (i.e., canceled) based on the difference between the target steering angle $\theta_s^*$ and the steering angle $\theta_s$ or the steering torque $T_h$ (time T6). Accordingly, the absolute value of the target steering angle $\theta_s^*$ starts decreasing gradually to the final target steering angle $\theta_s^*$ ($\theta_s^*=0°$ herein) by performing the change limiting function.

For example, a case in which the steering wheel 11 is steered in the counterclockwise direction (the positive direction) that is the same as the rotating direction in the adjustment process (T7) is assumed as a case of the driver's steering intervention. In this case, with the operation of the steering wheel 11, the steering angle $\theta_s$ starts increasing gradually in the positive direction that is the same as the rotating direction of the steering wheel 11 in the adjustment process. The reaction control unit 27 determines that the driver's steering intervention is performed based on the difference between the target steering angle $\theta_s^*$ and the steering angle $\theta_s$ or the steering torque $T_h$ (time T8). Thereafter, the reaction control unit 27 disables the change limiting function and calculates the upper limit value $\theta_{UL}$ and the lower limit value $\theta_{LL}$ based on the steering angle $\theta_s$ at each moment. The absolute value of the target steering angle $\theta_s^*$ calculated by the target steering angle calculating unit 51 is limited to the lower limit value $\theta_{LL}$ and thus decreases gradually to the final target steering angle $\theta_s^*$ ($\theta_s^*=0°$ herein) to conform to the change of the steering angle $\theta_s$. The difference between the target steering angle $\theta_s^*$ and the steering angle $\theta_s$ is not greater than the set value $\alpha$. Thereafter, when it is determined that the steering of the steering wheel in the positive direction is released based on the difference between the target steering angle $\theta_s^*$ and the steering angle $\theta_s$ or the steering torque $T_h$ (time T9), the reaction control unit 27 enables the change limiting function again. Accordingly, the absolute value of the target steering angle $\theta_s^*$ starts decreasing gradually to the final target steering angle $\theta_s^*$ ($\theta_s^*=0°$ herein) again by performing the change limiting function. Finally, the absolute value of the steering angle $\theta_s$ reaches the final target steering angle $\theta_s^*$. That is, the rotational position of the steering wheel 11 reaches a position corresponding to the turning position of the turning wheels 12.

In this way, the driver's steering intervention that is assumed when the process of adjusting the rotational position of the steering wheel 11 is being performed includes various intervention patterns (maintaining a steering hold state, and steering in the positive or negative direction). In any of the intervention patterns, the absolute value of the difference between the target steering angle $\theta_s^*$ and the steering angle $\theta_s$ is not greater than the set value $\alpha$. Accordingly, when the driver's steering intervention is released (i.e., when the driver's steering intervention is stopped) while the process of adjusting the rotational position of the steering wheel is being performed by the reaction control unit 27, the rotational position of the steering wheel 11 does not change suddenly.

In addition, when automatic rotation of the steering wheel 11 is hindered due to contact of the steering wheel 11 that is automatically rotating with a driver's body or a certain object, the limiting process for the target steering angle $\theta_s^*$ is also performed similarly to the case in which the driver's steering intervention is performed. Accordingly, when the automatic rotation of the steering wheel 11 is hindered while the adjustment process of automatically adjusting the rotational position of the steering wheel 11 is being performed, it is possible to curb sudden rotation of the steering wheel 11 when the hindered automatic rotation is released. Accordingly, since an unintentional behavior of the steering wheel 11 is curbed, it is possible to decrease a driver's feeling of discomfort.

Advantages of First Embodiment

Accordingly, according to the first embodiment, the following advantages can be achieved. (1) In the case where the automatic rotation of the steering wheel 11 is hindered while the adjustment process of automatically adjusting the rotational position of the steering wheel 11 is being performed, the value of the target steering angle $\theta_s^*$ is limited such that the absolute value of the difference between the target steering angle $\theta_s^*$ and the steering angle $\theta_s$ is not greater than the set value $\alpha$. The set value $\alpha$ is set based on the viewpoint of curbing an increase of the difference between the target steering angle and the steering angle, that is, the viewpoint of curbing sudden change of the steering angle $\theta_s$ when a reason for hindering the automatic rotation of the steering wheel 11 is resolved. Accordingly, in the case where the automatic rotation of the steering wheel 11 is hindered while the adjustment process of adjusting the rotational position of the steering wheel 11 is being performed by the reaction control unit 27, it is possible to curb sudden change of the rotational position of the steering wheel 11 when the hindered automatic rotation is released. Since an unexpected behavior of the steering wheel 11 is curbed, it is possible to decrease a driver's feeling of discomfort.

Second Embodiment

A steering system according to a second embodiment of the disclosure will be described below. This embodiment basically has the same configuration as the first embodiment illustrated in FIGS. 1 and 2. This embodiment may be embodied in combination with the first embodiment.

Figure 4:
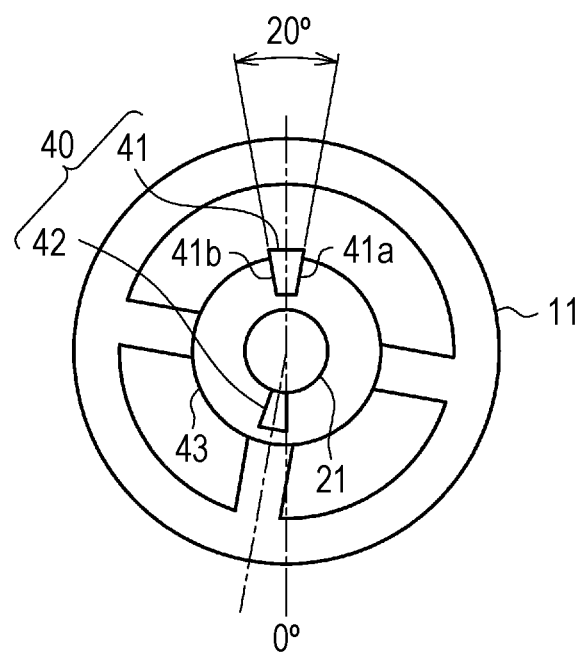
FIG. 4 is a rear view of a steering wheel according to a second embodiment.

As illustrated in FIG. 4, the reaction unit 20 includes a stopper mechanism 40. The stopper mechanism 40 is provided to limit the steering angle $\theta_s$ of the steering wheel 11. The stopper mechanism 40 restricts rotation of the steering wheel 11 over one turn (360°). FIG. 4 is a rearview of the steering wheel 11.

The stopper mechanism 40 includes a first restriction member 41 and a second restriction member 42. The first restriction member 41 is fixed to a steering column 43 that supports the steering shaft 21 at the vehicle body. The first restriction member 41 extends in a radial direction of the steering shaft 21. The first restriction member 41 includes a first restriction surface 41a and a second restriction surface 41b that are located on opposite sides in the rotating direction of the steering shaft 21. The first restriction surface 41a and the second restriction surface 41b are inclined such that the restriction surfaces approach each other toward the steering shaft 21 in the radial direction of the steering shaft 21. The first restriction member 41 is provided to correspond to the neutral position of the steering wheel 11.

The second restriction member 42 is fixed to an outer peripheral surface of the steering shaft 21. The second restriction member 42 is located in the vicinity of an end of the steering shaft 21 on the side of the steering wheel 11. The second restriction member 42 extends in a direction perpendicular to a rotation center axis of the steering shaft 21. The second restriction member 42 is configured to come into contact with the first restriction member 41 in the rotating direction of the steering shaft 21. Accordingly, the steering wheel 11 moves between a first restriction position at which the second restriction member 42 is in contact with the first restriction surface 41a of the first restriction member 41 and a second restriction position at which the second restriction member 42 is in contact with the second restriction surface 41b of the first restriction member 41.

When an angle that is formed by the first restriction surface 41a and the second restriction surface 41b is set to, for example, 20°, the second restriction member 42 comes into contact with the first restriction surface 41a of the first restriction member 41 at a time at which the steering wheel 11 rotates rightward by 170° with respect to the neutral position of the steering wheel 11. The second restriction member 42 comes into contact with the second restriction surface 41b of the first restriction member 41 at a time at which the steering wheel 11 rotates leftward by 170° with respect to the neutral position of the steering wheel 11. That is, an operating range of the steering wheel 11 is limited to a range of ±170° with respect to the neutral position of the steering wheel 11, that is, a total range of 340°.

The positional relationship between the steering wheel 11 and the turning wheels 12 is maintained at a positional relationship corresponding to a predetermined steering angle ratio. For example, when the steering wheel 11 is operated in the entire operating range thereof, the turning wheels 12 are turned in the entire turning range thereof. Here, since the operating range of the steering wheel 11 is limited to a range less than 360°, it is possible to turn the turning wheels 12 in the entire turning range without rotating the steering wheel 11 by one turn. That is, it is not necessary to perform a hand switching operation (hand-over-hand operation) on the steering wheel 11.

In the steering system 10, the turning motor 32 is controlled based on the steering angle $\theta_s$ of the steering wheel 11. The steering system 10 includes the stopper mechanism 40 that is provided to limit the steering angle $\theta_s$ of the steering wheel 11. Accordingly, in order to maintain the positional relationship between the steering wheel 11 and the turning wheels 12 at the positional relationship corresponding to a predetermined steering angle ratio, the neutral steering position of the steering wheel 11 and a neutral turning position of the turning wheels 12 need to be matched.

For example, when a battery is detached from the vehicle in replacement work of the battery, electric power is not supplied to the reaction control unit 27. Accordingly, the steering angle midpoint information stored in the reaction control unit 27 is lost. Accordingly, it may be difficult to maintain the positional relationship between the steering wheel 11 and the turning wheels 12 at the positional relationship corresponding to the predetermined steering angle ratio. Therefore, the reaction control unit 27 sets the steering angle midpoint information again when the vehicle is first power on after a new battery has been attached to the vehicle.

The reaction control unit 27 acquires steering angle midpoint information by performing the adjustment process of adjusting the rotational position of the steering wheel 11. That is, the reaction control unit 27 first calculates a current steering angle $\theta_s$ as an initial position of the steering wheel 11 based on the rotation angle $\theta_a$ of the reaction motor 22 at a time point at which the vehicle has been first powered on, and temporarily stores the calculated steering angle $\theta_s$.

Then, the reaction control unit 27 sets a first target steering angle based on the steering angle $\theta_s$ stored as the initial position of the steering wheel 11 such that the steering wheel 11 rotates rightward to a position at which the second restriction member 42 comes into contact with the first restriction surface 41a of the first restriction member 41. The reaction control unit 27 temporarily stores, as a first end angle, the steering angle $\theta_s$ at a time when the second restriction member 42 comes into contact with the first restriction surface 41a of the first restriction member 41 by performing the steering angle feedback control.

Then, the reaction control unit 27 sets a second target steering angle based on the steering angle $\theta_s$ stored as the initial position of the steering wheel 11 such that the steering wheel 11 rotates leftward to a position at which the second restriction member 42 comes into contact with the second restriction surface 41b of the first restriction member 41. The reaction control unit 27 temporarily stores, as a second end angle, the steering angle $\theta_s$ at a time when the second restriction member 42 comes into contact with the second restriction surface 41b of the first restriction member 41 by performing the steering angle feedback control.

Then, the reaction control unit 27 calculates a value that is half the sum of the first end angle and the second end angle, as a midpoint of the steering angle $\theta_s$. The calculated midpoint of the steering angle $\theta_s$ corresponds to a motor midpoint that is the rotation angle $\theta_a$ of the reaction motor 22 at a time when the steering wheel 11 is located at the neutral steering position. The reaction control unit 27 stores the calculated midpoint of the steering angle $\theta_s$ and the motor midpoint, as the steering angle midpoint information. In this way, the process of setting a steering angle midpoint is completed.

Thereafter, the reaction control unit 27 sets, as a third target steering angle, a value of the midpoint of the steering angle $\theta_s$ stored as the steering angle midpoint information such that the steering wheel 11 rotates to the position corresponding to the true midpoint of the steering angle $\theta_s$. The reaction control unit 27 rotates the steering wheel 11 to the position at which the steering angle $\theta_s$ matches the third target steering angle by performing the steering angle feedback control. Accordingly, the rotational position of the steering wheel 11 reaches the position corresponding to the true midpoint of the steering angle $\theta_s$. In this way, the process of adjusting the rotational position of the steering wheel 11 when the steering angle midpoint information is acquired is completed.

In the steering system 10 having a function of automatically setting the steering angle midpoint, there is concern about the followings. That is, it is conceivable that a driver may be gripping the steering wheel 11 or the steering wheel 11 that is automatically rotating may come into contact with the driver's body or an object while the steering angle midpoint setting process is being performed. In this case, since the automatic rotation of the steering wheel 11 is hindered, the target steering angle $\theta_s^*$ changes gradually to the final target steering angle $\theta_s^*$ through the change limiting function, but the actual steering angle $\theta_s$ does not change. Accordingly, there is a likelihood that a difference between the target steering angle $\theta_s^*$ and the actual steering angle $\theta_s$ of the steering wheel 11 will increase. Therefore, when the reason for hindering the automatic rotation of the steering wheel 11 is resolved, for example, when the driver detaches the hand from the steering wheel 11, the steering wheel 11 may rotate suddenly to the target steering angle $\theta_s^*$ and the driver may feel discomforted due to the sudden rotation of the steering wheel 11.

Therefore, in this embodiment, in the case where the steering angle midpoint setting process is performed, an increase of the difference between the target steering angle $\theta_s^*$ and the steering angle $\theta_s$ is curbed by limiting the change range of the target steering angle $\theta_s^*$ when the automatic rotation of the steering wheel 11 is hindered, in the same way as in the case in which the process of adjusting the rotational position of the steering wheel 11 is performed in the first embodiment.

The reaction control unit 27 performs the following process, for example, when steering intervention is performed by a driver while the steering angle feedback control for matching the steering angle $\theta_s$ of the steering wheel 11 with the first target steering angle is being performed such that the second restriction member 42 comes into contact with the first restriction surface 41*a* of the first restriction member 41. That is, the reaction control unit 27 disables the change limiting function in the period in which the driver's steering intervention is performed, and sets the upper limit value $\theta_{UL}$ and the lower limit value $\theta_{LL}$ for the target steering angle $\theta_s^*$, based on the steering angle $\theta_s$ at each moment. The change range of the target steering angle $\theta_s^*$ that is calculated by the target steering angle calculating unit 51 is limited by the upper limit value $\theta_{UL}$ and the lower limit value $\theta_{LL}$.

The reaction control unit 27 also performs the following process, for example, when steering intervention is performed by a driver while the steering angle feedback control for matching the steering angle $\theta_s$ of the steering wheel 11 with the second target steering angle is being performed such that the second restriction member 42 comes into contact with the second restriction surface 41*b* of the first restriction member 41. That is, the reaction control unit 27 disables the change limiting function in the period in which the driver's steering intervention is performed, and sets the upper limit value $\theta_{UL}$ and the lower limit value $\theta_{LL}$ for the target steering angle $\theta_s^*$, based on the steering angle $\theta_s$ at each moment.

The reaction control unit 27 also performs the following process, for example, when steering intervention is performed by a driver while the steering angle feedback control for matching the steering angle $\theta_s$ with the third target steering angle is being performed such that the steering wheel 11 rotates to the position corresponding to the true midpoint of the steering angle $\theta_s$. That is, the reaction control unit 27 disables the change limiting function, for example, in the period in which the driver's steering intervention is performed, and sets the upper limit value $\theta_{UL}$ and the lower limit value $\theta_{LL}$ for the target steering angle $\theta_s^*$, based on the steering angle $\theta_s$ at each moment.

In this way, the driver's steering intervention that is assumed when the steering angle midpoint setting process is being performed includes various intervention patterns (maintaining a steering hold state and steering in the positive or negative direction). In any of the intervention patterns, the absolute value of the difference between the target steering angle $\theta_s^*$ (the first target steering angle, the second target steering angle, and the third target steering angle herein) and the steering angle $\theta_s$ is not greater than the set value $\alpha$. Accordingly, when the driver's steering intervention is performed while the steering angle midpoint setting process is being performed, it is possible to curb sudden change of the rotational position of the steering wheel 11 when the steering intervention is released (i.e., when the steering intervention is stopped).

In addition, when automatic rotation of the steering wheel 11 is hindered due to contact of the steering wheel 11 that is automatically rotating with a driver's body or a certain object, the limiting process for the target steering angle $\theta_s^*$ (the first target steering angle, the second target steering angle, and the third target steering angle herein) is also performed similarly to the case in which the driver's steering intervention is performed. Accordingly, in the case where the automatic rotation of the steering wheel 11 is hindered while the steering angle midpoint setting process is being performed, it is possible to curb sudden rotation of the steering wheel 11 when the hindered automatic rotation is released. Accordingly, since an unintentional behavior of the steering wheel 11 is curbed, it is possible to decrease a driver's feeling of discomfort.

According to the second embodiment, the following advantages can be achieved. (2) For example, in the case where automatic rotation of the steering wheel 11 is hindered due to a driver's steering intervention while the steering angle midpoint setting process is being performed, the value of the target steering angle $\theta_s^*$ is limited such that the absolute value of the difference between the target steering angle $\theta_s^*$ (the first target steering angle, the second target steering angle, and the third target steering angle herein) and the steering angle $\theta_s$ is not greater than the set value $\alpha$. The set value $\alpha$ is set based on the viewpoint of curbing sudden change of the steering angle $\theta_s$. Accordingly, in the case where the automatic rotation of the steering wheel 11 is hindered while the steering angle midpoint setting process is being performed by the reaction control unit 27, it is possible to curb sudden change of the rotational position of the steering wheel 11 when the hindered automatic rotation is released. As a result, since an unintentional behavior of the steering wheel 11 is curbed, it is possible to decrease a driver's feeling of discomfort.

Third Embodiment

A steering system according to a third embodiment of the disclosure will be described below. This embodiment basically has the same configuration as that of the first embodiment illustrated in FIG. 1, and this embodiment is different from the first embodiment in the configuration of the reaction control unit 27. This embodiment may be embodied in combination with the second embodiment.

Figure 5:
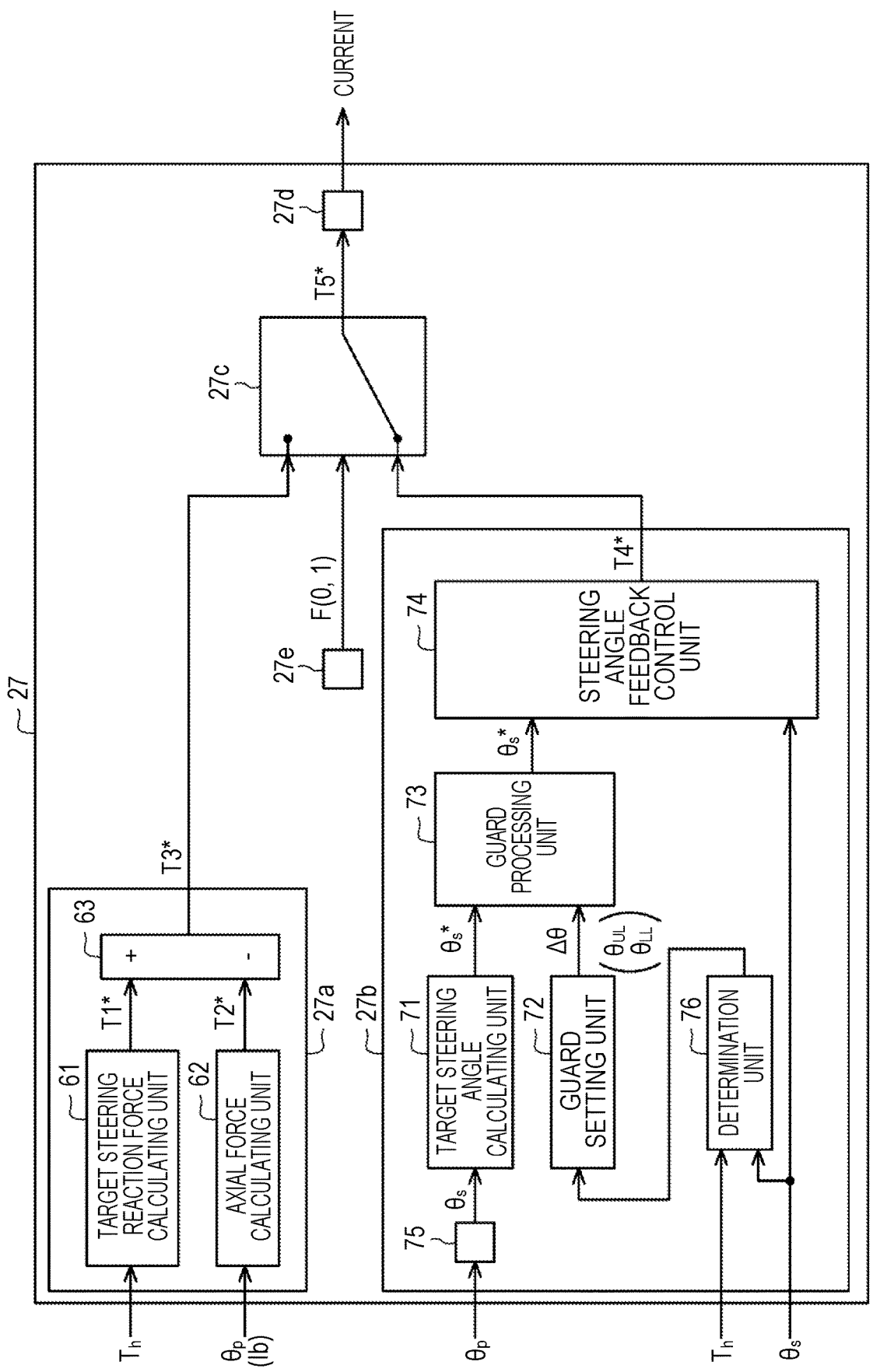
FIG. 5 is a block diagram illustrating a reaction control unit according to a third embodiment.

As illustrated in FIG. 5, the reaction control unit 27 includes a first control unit 27*a*, a second control unit 27*b*, a switch 27*c*, a power supply control unit 27*d*, and a flag setting circuit 27*e*. The first control unit 27*a* is a unit that performs normal reaction control for generating a steering reaction force corresponding to the steering torque $T_h$ through drive control of the reaction motor 22. The first control unit 27*a* includes a target steering reaction force calculating unit 61, an axial force calculating unit 62, and a subtractor 63.

The target steering reaction force calculating unit 61 calculates a target steering reaction force T1* based on the steering torque $T_h$. The target steering reaction force T1* is a target value of a steering reaction force that is to be generated from the reaction motor 22. The target steering reaction force calculating unit 61 calculates the target steering reaction force T1* of which the absolute value becomes larger as the absolute value of the steering torque $T_h$ become larger.

The axial force calculating unit 62 calculates an axial force that is applied to the turning shaft 31 via the turning wheels 12, for example, based on at least one of the value of the rotation angle $\theta_p$ of the pinion shaft 34 and the value of a current $I_b$ of the turning motor 32 and calculates an equivalent torque value (that is, a steering reaction force based on the axial force) T2* obtained by converting the calculated axial force to a torque.

The subtractor 63 calculates a target steering reaction force T3* by subtracting the equivalent torque value T2* calculated by the axial force calculating unit 62 from the target steering reaction force T1* calculated by the target steering reaction force calculating unit 61.

The second control unit 27b is a unit that performs the process of adjusting the rotational position of the steering wheel 11. The process of adjusting the rotational position of the steering wheel 11 means the adjustment process of automatically adjusting the rotational position of the steering wheel 11 according to the first embodiment or the steering angle midpoint setting process according to the second embodiment. The second control unit 27b includes a target steering angle calculating unit 71, a guard setting unit 72, a guard processing unit 73, a steering angle feedback control unit 74, a steering angle calculating unit 75, and a determination unit 76.

The steering angle calculating unit 75 calculates the steering angle $\theta_s$ corresponding to the rotation angle $\theta_p$ of the pinion shaft 34 based on the rotation angle $\theta_p$ of the pinion shaft 34 and the steering angle ratio. The target steering angle calculating unit 71, the guard setting unit 72, the guard processing unit 73, the steering angle feedback control unit 74, and the determination unit 76 basically have the same functions as those of the target steering angle calculating unit 51, the guard setting unit 52, the guard processing unit 53, the steering angle feedback control unit 54, and the determination unit 56 in the first embodiment illustrated in FIG. 2. The target steering angle calculating unit 71 calculates a target steering angle $\theta_s^*$ based on the steering angle $\theta_s$ calculated by the steering angle calculating unit 75. The steering angle feedback control unit 74 receives the target steering angle $\theta_s^*$ that has been processed by the guard processing unit 73 and the steering angle $\theta_s$ calculated based on the rotation angle $\theta_a$ of the reaction motor 22, and calculates a target steering reaction force T4* through feedback control of the steering angle $\theta_s$ such that the received steering angle $\theta_s$ reaches the target steering angle $\theta_s^*$.

The switch 27c receives the target steering reaction force T3* calculated by the first control unit 27a and the target steering reaction force T4* calculated by the second control unit 27b as data inputs. The switch 27c receives a flag F that is set by the flag setting circuit 27e as a control input. When the vehicle is powered on, the flag setting circuit 27e sets the value of the flag F to "0" when position adjustment of the steering wheel 11 is necessary and the position adjustment has not been completed. When the vehicle is powered on, the flag setting circuit 27e sets the value of the flag F to "1" when position adjustment of the steering wheel 11 is necessary and the position adjustment has been completed or when position adjustment of the steering wheel 11 is not necessary.

The switch 27c selects, as a final target steering reaction force T5*, one of the target steering reaction force T3* calculated by the first control unit 27a and the target steering reaction force T4* calculated by the second control unit 27b, based on the value of the flag F. When the value of the flag F is "0," the switch 27c selects the target steering reaction force T4* calculated by the second control unit 27b, as the final target steering reaction force T5*. When the value of the flag F is "1," the switch 27c selects the target steering reaction force T3* calculated by the first control unit 27a, as the final target steering reaction force T5*.

The power supply control unit 27d supplies electric power corresponding to the final target steering reaction force T5* selected by the switch 27c to the reaction motor 22. Accordingly, according to the third embodiment, the following advantages can be achieved in addition to the advantages described in (1) of the first embodiment or (2) of the second embodiment.

(3) The normal reaction control that is performed by the first control unit 27a and control for adjusting the rotational position of the steering wheel 11 are selectively performed (i.e., control is switched between the normal reaction control and the control for adjusting the rotational position of the steering wheel 11) based on whether the process of adjusting the rotational position of the steering wheel 11 has been completed. Accordingly, it is possible to prevent the normal reaction control and the control for adjusting the rotational position of the steering wheel 11 from interfering with each other.

Other Embodiments

The first to third embodiments may be modified as follows. In the second embodiment, the steering angle midpoint setting process is performed when the power supply of the vehicle is first turned on after a battery has been replaced, but, for example, the steering angle midpoint setting process may be performed when the power supply of the vehicle is turned on regardless of whether replacement work of a battery has been performed.

In the second embodiment, a midpoint $\theta_{s^0}$ of the steering angle $\theta_s$ corresponding to the neutral position of the steering wheel 11 is used as a reference point of the operation of the reaction unit 20, but a steering angle $\theta_s$ corresponding to a position departing from the neutral position of the steering wheel 11 may be used as the reference point of the operation of the reaction unit 20 as long as it can be correlated with the turning angle $\theta_w$ of the turning wheels 12.

As indicated by an alternate long and two short dashes line in FIG. 1, in the first to third embodiments, for example, when a notification unit 28 is provided in a vehicle cabin, the reaction control unit 27 may notify a driver of start and end of the position adjustment of the steering wheel 11 and start and end of the steering angle midpoint setting process using the notification unit 28. Examples of a notification operation using the notification unit 28 include display of a message using text and emission of a message using voice. With this configuration, since a driver can recognize that the steering wheel 11 is automatically rotating and the steering wheel 11 that is automatically rotating stops automatically, it is possible to decrease the driver's feeling of discomfort.

In the first to third embodiments, the steering angle $\theta_s$ that is calculated based on the rotation angle $\theta_a$ of the reaction motor 22 is used, but a steering angle $\theta_s$ that is detected by a steering angle sensor may be used when a configuration including the steering angle sensor is employed as the steering system 10. In the first to third embodiments, the angle difference threshold value $\theta_{th}$ serving as a reference for determining whether the automatic rotation of the steering wheel 11 is hindered may be set to a value that is equal to or different from the set value $\alpha$ (see Expressions (C1) and (C2)) that is used to calculate the upper limit value $\theta_{UL}$ and the lower limit value $\theta_{LL}$ for the target steering angle.

In the first to third embodiments, the steering angle ratio is set to an appropriate value depending on product specifications or the like. The steering angle ratio may be, for example, "$\theta_s:\theta_w=1:1$" or "$\theta_s:\theta_w=1:3$." For example, when the steering angle ratio is "$\theta_s:\theta_w=1:3$" and the steering angle $\theta_s$ is displaced by 10°, the turning angle $\theta_w$ is displaced by 30°. Accordingly, it is more preferable to correctly synchronize the steering angle $\theta_s$ and the turning angle $\theta_w$ with each other.

In the first to third embodiments, the reaction control unit 27 may employ a configuration in which a change limiting function is omitted depending on product specifications or the like. In the case where this configuration is employed, the process of disabling the change limiting function is omitted when automatic rotation of the steering wheel 11 is hindered while the process of adjusting the rotational position of the steering wheel 11 is being performed or while the process of setting the steering angle midpoint is being performed.

In the first to third embodiments, the reaction control unit 27 and the turning control unit 36 may be configured as a single control unit. In the first to third embodiments, a power supply of a vehicle may include, for example, an accessory power supply (an ACC power supply) or an ignition power supply (an IG power supply).

In the first to third embodiments, the steering system 10 of a vehicle has a so-called linkless structure in which transmission of power between the steering shaft 21 and the turning wheels 12 is cut off, but may employ a structure in which transmission of power between the steering shaft 21 and the turning wheels 12 can be cut off by a clutch. When the clutch is disengaged, the transmission of power between the steering wheel 11 and the turning wheels 12 is cut off. When the clutch is engaged, power is transmitted between the steering wheel 11 and the turning wheels 12.

The second embodiment may be applied to an electric power steering system in which the steering shaft 21 and the turning shaft 31 are connected, for example, via a rack and pinion mechanism. In this case, the reaction motor 22 serves as a source of an assist force that is a force for assisting the operation of the steering wheel 11.

What is claimed is:

1. A steering system comprising:
   a steering shaft that rotates along with an operation of a steering wheel;
   a motor configured to generate a torque that is applied to the steering shaft; and
   a control unit configured to control the motor,
   wherein the control unit has a function of performing steering angle feedback control for causing a steering angle that is a rotation angle of the steering wheel to reach a target steering angle that is set based on a point of view of adjusting a rotational position of the steering wheel, as an adjustment process of adjusting the rotational position of the steering wheel, and
   wherein the control unit is configured to:
   in response to detecting that automatic rotation of the steering wheel is hindered while the adjustment process is being performed, set a limit value for limiting a change range of the target steering angle with respect to the steering angle at each moment in a period, such that a difference between the target steering angle and the steering angle is the limit value at each moment in the period.

2. The steering system according to claim 1, wherein:
   the control unit has a limiting function of limiting a change amount of the target steering angle per unit time; and
   the control unit is configured to disable the limiting function in the period in which the automatic rotation of the steering wheel is hindered in the case where the automatic rotation is hindered while the adjustment process is being performed.

3. The steering system according to claim 1, wherein the adjustment process includes a process of causing the rotational position of the steering wheel to correspond to a turning position of turning wheels of a vehicle when a power supply of the vehicle is switched from an off state to an on state.

4. The steering system according to claim 1, further comprising
   a stopper mechanism configured to restrict rotation of the steering wheel,
   wherein the adjustment process includes a process of causing the steering wheel to perform a rotating operation to a first operation end and then causing the steering wheel to perform a reverse rotating operation to a second operation end by controlling the motor, and calculating a neutral position of the steering wheel based on rotation angles of the motor at a start time point and an end time point of the reverse rotating operation of the steering wheel.

5. The steering system according to claim 1, wherein:
   transmission of power between the steering shaft and turning wheels of a vehicle is cut off; and
   the motor is configured to generate a steering reaction force that is applied to the steering shaft and that is the torque in a direction opposite to a steering direction.

6. The steering system according to claim 1, wherein the limit value is a constant value, such that the difference between the target steering angle and the steering angle is the constant value at each moment in the period.

* * * * *